INVENTOR
Donald J. Campbell
Charles W. Dake
BY
ATTORNEYS

Dec. 22, 1936.    D. J. CAMPBELL ET AL    2,064,820
CAM HARDENING MACHINE
Filed Jan. 7, 1936    5 Sheets-Sheet 4

INVENTOR
Donald J. Campbell
Charles W. Dake
BY Liverance & Van Antwerp
ATTORNEYS Dec. 22, 1936.　　　D. J. CAMPBELL ET AL　　　2,064,820
CAM HARDENING MACHINE
Filed Jan. 7, 1936　　　5 Sheets-Sheet 5

INVENTOR
Donald J. Campbell
Charles W. Dake
BY
ATTORNEY

Patented Dec. 22, 1936

2,064,820

UNITED STATES PATENT OFFICE 2,064,820

CAM HARDENING MACHINE

Donald J. Campbell, Spring Lake Township, Ottawa County, and Charles W. Dake, Grand Haven, Mich., assignors to Campbell, Wyant & Cannon Foundry Company, Muskegon Heights, Mich., a corporation of Michigan Application January 7, 1936, Serial No. 57,902

8 Claims. (Cl. 266—2)

This invention relates to the hardening of cams of engine cam shafts, and is more particularly directed to a novel, and particularly practical and efficient machine for accomplishing such hardening in a very simple and practical manner. The machine of this invention is one which may be used as one part of the apparatus used in the cam hardening method which forms the subject matter of the application of Donald J. Campbell, Serial No. 50,396, filed November 18th, 1935.

In such application for Method of hardening cams, the steps consist of heating the cams which are to be hardened to a high degree of temperature, approximately 1100° or 1200° F., and then rotating the same while they are at or closely approaching such temperature, and subjecting the rotating cams to a draft of air in which water vapor is intermingled, the moisture laden air being at a desired temperature, whereby there is a rapid and uniform quick cooling of the heated cams without check or cracks to thus attain the desired degree of hardness whereby the cams may withstand the severe wearing service to which they are subjected in use. Our invention is directed to the machine which receives and rotates the cams and which has a means for directing the moisture charged air simultaneously and evenly against all of the heated cams; and, in one form, delivers the cam shafts from the machine.

The cam shafts which are to be subjected to the hardening treatment are produced by casting. The material of the shafts is an iron alloy, that is, iron containing certain percentages of alloying metals, like chromium, molybdenum and nickel, and of course, various amounts of other elements which are common to cast iron, such as small percentages of carbon and silicon, with usually traces of sulphur and phosphorus, though the sulphur and phosphorus is to be maintained at the smallest possible limits and is present merely because of the impossibility of completely removing the same when the iron is reduced from the ore.

An understanding of the machine which is the subject matter of this application may be had from the following description, taken in connection with the accompanying drawings, in which, Fig. 1 is a side elevation of the machine.

Like reference characters refer to like parts in the different figures of the drawings.

Figure 1:
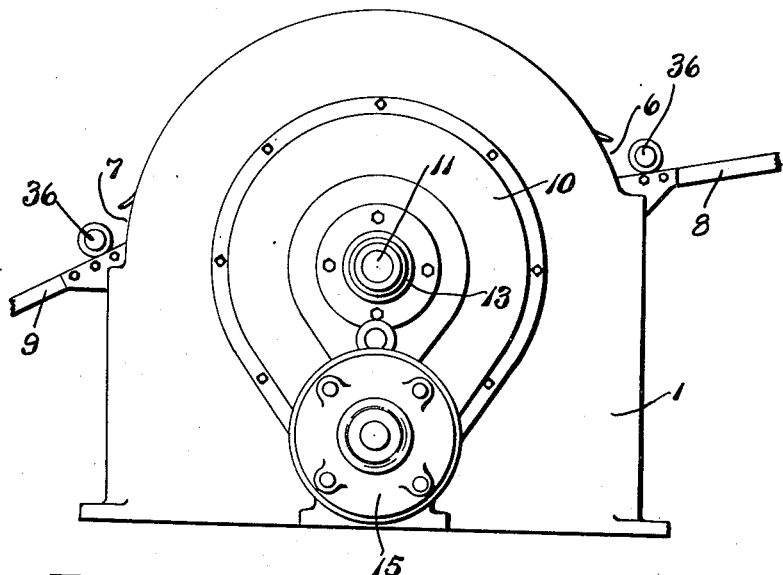
Figure 2:
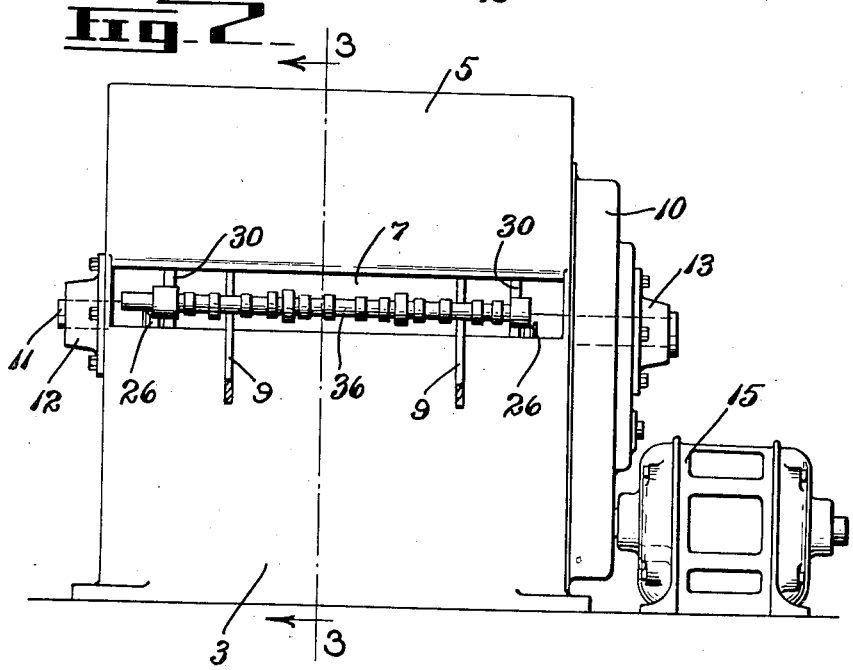
Fig. 2 is a front elevation of the machine, that is, looking at Fig. 1 from the left.

The preferred form of structure, as illustrated in Figs. 1 to 4, includes an enclosing housing which has spaced apart sides 1, a front 3, a back 4 which reaches to a greater height than the front 3 and a curved cover 5 in which are entrance and outlet elongated openings 6 and 7 positioned immediately above the upper edges of the back 4 and the front 3, respectively, the cam shafts entering through the opening 6 and leaving through the opening 7. Inclined ways 8 are connected to the back 4 and extend into the housing through the opening 6 and down which a cam shaft may roll to enter the opening 6 and be engaged by the hereafter described rotating carrier therein, while other inclined ways 9 connected to the front 3 extend from the interior of the housing through the outlet opening 7, to which the cam shafts are delivered after the same have been subjected to treatment.

Figure 4:
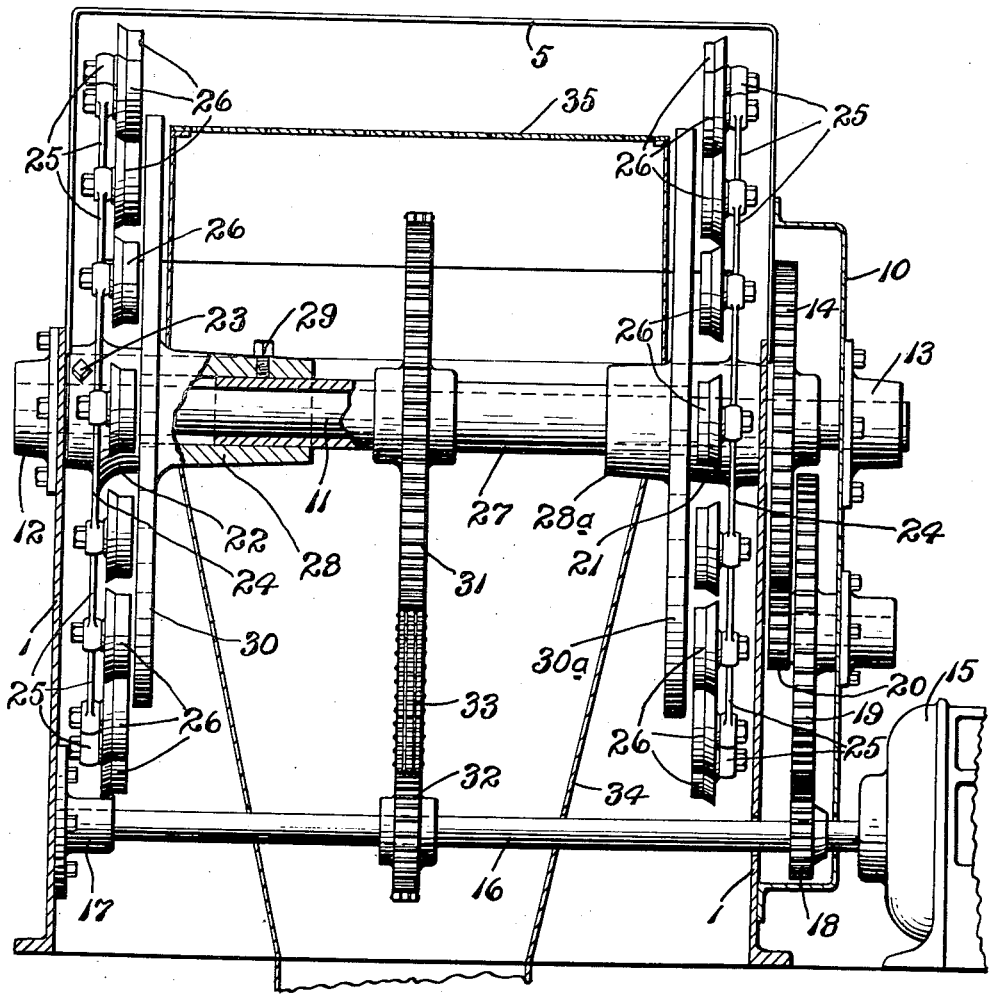
Fig. 4 is a section at right angles to that shown in Fig. 3 taken along the line 4—4 thereof, illustrating the interior mechanism of the machine and the construction thereof.

At one side of the housing described and attached to the side 1 thereof is a gear housing 10 (Figs. 1 and 4). A shaft 11 extends through the housing and through the gear housing 10 and is mounted at its ends in suitable bearings 12 and 13, respectively, as shown in Fig. 4. It carries a gear 14 attached thereto within the gear housing 10. The shaft is driven by an electric motor 15 which has an elongated shaft 16 extending through the lower part of the housing and having a bearing at its outer end at 17 secured to the side 1 farthest from the motor, whereby the shaft 16 is located below and parallels the shaft 11. A pinion 18 on the motor shaft 16 drives a large gear 19, connected with which is a smaller gear 20 which meshes with the gear 14. Thus the motor drives the shaft 11 at relatively slow speed.

Figure 3:
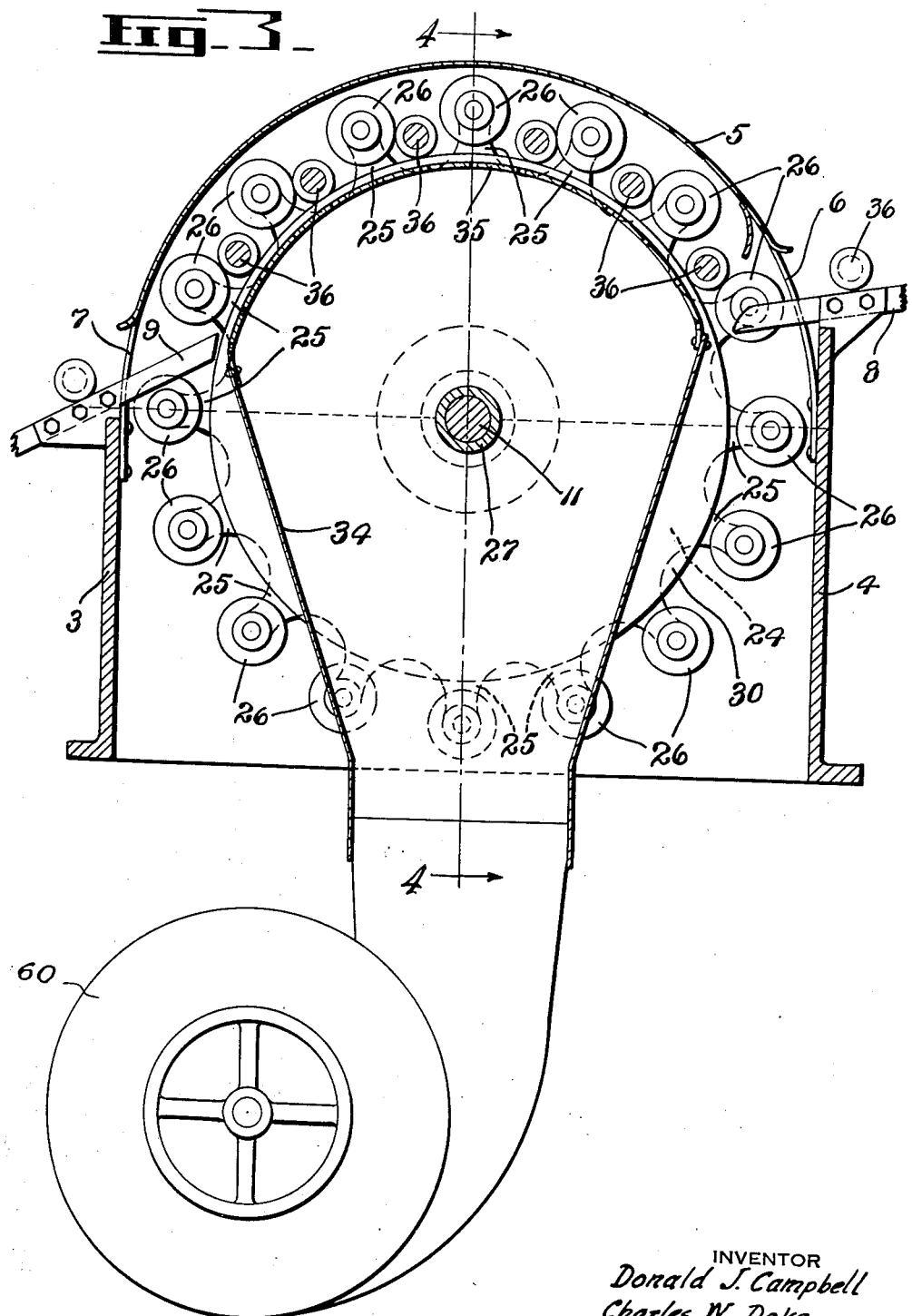
Fig. 3 is a vertical section substantially on the plane of line 3—3 of Fig. 2.

A hub 21 is secured to the shaft 11 inside the end 1 of the housing adjacent which the gear housing 10 is located. A similar hub 22 is adjustably secured to the shaft 11 near the opposite end of said shaft. It may be shifted to different places in the length of the shaft 11 within a limited distance and then secured in any position to which adjusted by means of a set screw 23 (Fig. 4). Each of the hubs carries a flat disk 24 of relatively large diameter compared to the diameter of the hubs. Said disks adjacent their peripheries are formed with a plurality of spaced apart radially projecting fingers or lugs 25 on each of which, at its inner side, a roller 26 is mounted to freely rotate. The rollers and radial fingers on the two disks are equal in number and the disks are so positioned with respect to each other that the radially projecting lugs and rollers 26 stand directly opposite each other, so that as the shaft 11 is slowly rotated, thereby turning the disks 24, a cam shaft placed upon the entrance ways 8 will be received between two of the radially projecting fingers or lugs 25 of each disk 24 and above the rollers 26 carried by the lowermost of the fingers between which it enters, as shown in Fig. 3. The cam shaft will ride upon the rollers 26 carried by the lowermost fingers 25 until the same has been carried to its highest point and then it moves downwardly to engage against the opposite rollers 26 moving with the same until the outlet ways 9 are reached. All of this is fully shown in Fig. 3.

A sleeve 27 is loosely mounted on the shaft 11. The sleeve is shorter than the distance between hubs 21 and 22. A hub 28 extends over one end of the sleeve, as shown in Fig. 4, and may be adjusted to different positions thereon and held in any positon to which adjusted by a set screw 29. The hub 28 is adjacent the same end of the shaft 11 as the adjustable hub 22 previously described. A second hub 28a is fixed to the sleeve 27 and lies at one end against the hub 21 previously described. Disks 30 and 30a are carried by the hubs 28 and 28a. The radius of the disks 30 and 30a is less than the distance from the center of the shaft 11 to the outer ends of the fingers 25 but greater than the distance from the center of said shaft 11 to the bottoms of the recess between said fingers (see Fig. 3). Therefore, when a cam shaft is received between fingers 25 it lies against the edges of the disks 30 and 30a, as shown in Fig. 3, and does not drop to the bottoms of the recesses between said fingers.

A gear 31 is secured to the sleeve 27 and directly beneath the same a driving pinion or gear 32 is fixed to the motor shaft 16. A belt 33 around the gears 31 and 32 insures that the sleeve 27 and the disks 30 and 30a connected therewith will rotate but at a different speed than the rotation of the disks 24. With the gearing between the motor 15 and the shaft 11 as shown, the two shafts 11 and 16 rotate in the same direction. This is not necessary, however, as it makes no difference whether the direction of rotation of the shafts 11 and 16 is the same. It will serve its purpose quite as well if the rotations of the shaft 11 and of the shaft 16, or of the sleeve 27 mounted on the shaft 11, are in reverse directions.

Figure 9:
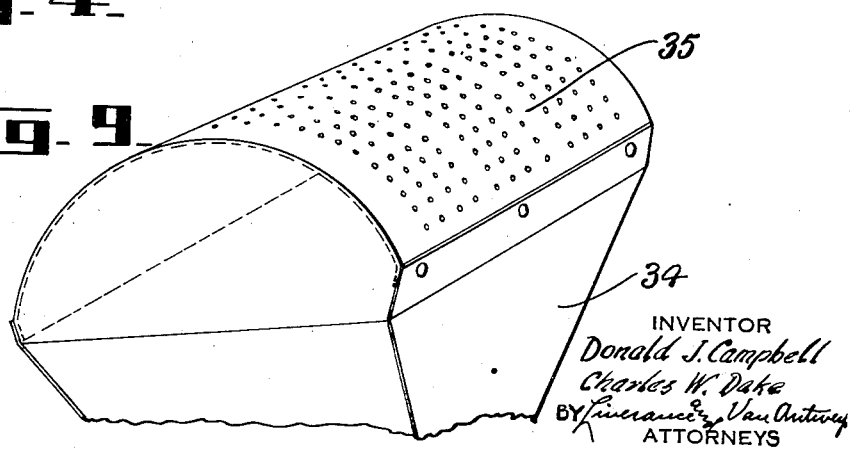
Fig. 9 is a fragmentary perspective view of the air passing bonnet employed in the preferred form of structure shown in Figs. 1 to 4, inclusive.
Figure 5:
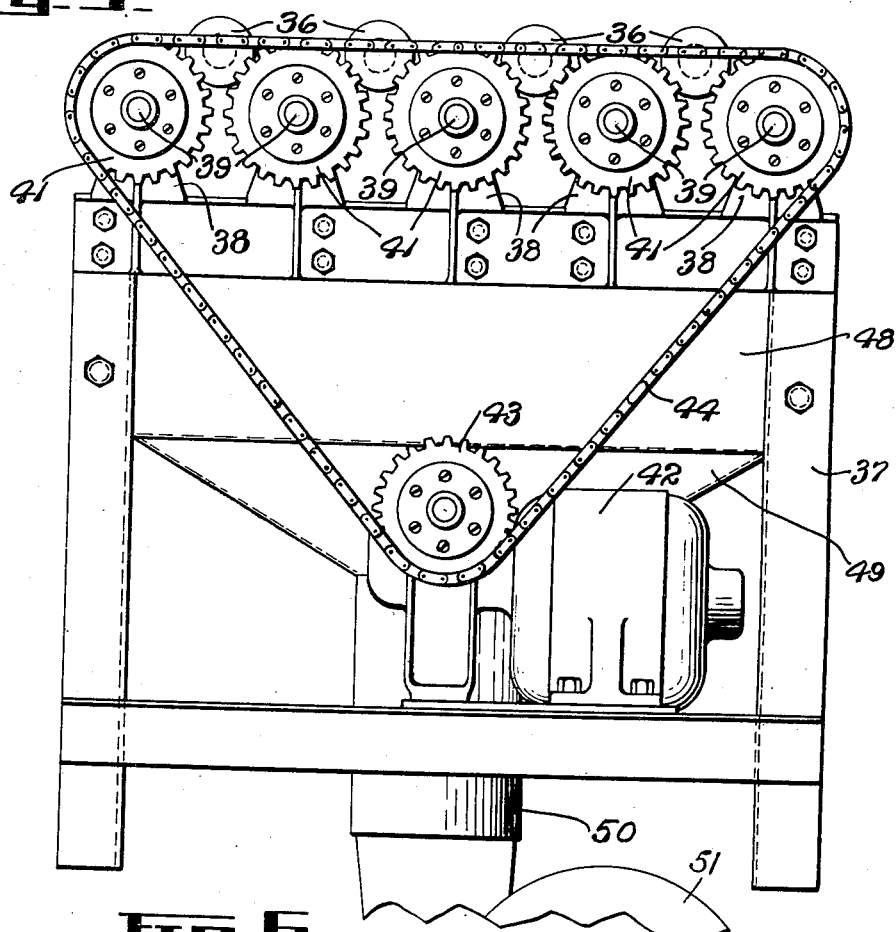
Fig. 5 is an elevation of an alternative structure of machine for hardening the cams.
Figure 6:
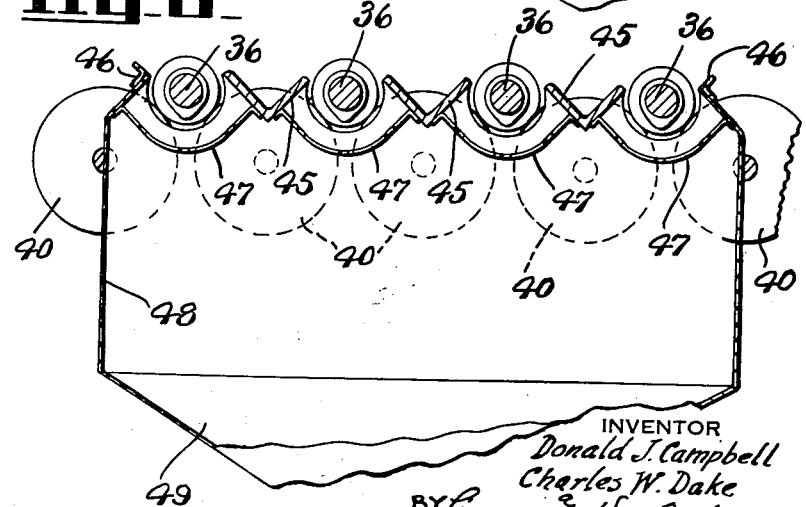
Fig. 6 is a vertical section through the upper part of the machine shown in Fig. 5 and is taken on the plane of line 6—6 of Fig. 8.

A bonnet 34 of the hollow upwardly flared out construction shown in Fig. 9, and covered with a curved top 35, said top having a large number of small openings therethrough, is positioned within the housing so that its curved top lies just within the curved edges of the disks 30 and 30a (Fig. 3). Air charged with moisture and at a predetermined desired temperature is forced into said bonnet by means of the blower 60 and passes outwardly through the openings in the top 35 so as to contact or spray directly against the cam shafts carried through the machine.

The cam shafts are of an elongated character, as shown at 36 in Fig. 10, from which at spaced apart points cams project at right angles. Such cam shaft is of old and well known form and has long been made from a steel forging and used in internal combustion engines such as supply the motive power for motor vehicles.

The cams, and at the same time if desired, the bearing rollers of the shafts, are heated in any suitable manner so as to raise the same to a high temperature, in the neighborhood of 1200° or 1300° F. The cam shaft is then placed upon the entrance ways 8 and rolls down the same into the machine described through the entrance opening 6. It strikes against the edges of the disks 30 and 30a and is engaged by the adjacent rollers 26 carried by the disks 24. The disks 30 and 30a, being driven by the motor 15, rotate the cam shaft about its longitudinal axis, and the cam shaft in turn rotates the rollers 26 thereby largely eliminating friction which would otherwise occur if the shafts rested directly against the fingers 25. The disks 24 slowly turn in a counterclockwise direction (referring to Fig. 3) and the rotating cam shafts are thereupon carried slowly over the curved top 35 of the bonnet described, through which top there is a continuous projection of moisture laden air at a prescribed temperature. By the time that a cam shaft reaches the outlet way at 9, the heated cams have been cooled and as a result of such cooling and subjecting to the moisture in the air at the proper temperature the cams are hardened without the production of checks or cracks. A uniform hardening of the cams takes place without detrimental effect.

The machine described is very practical and efficient. All that the operator has to do is to place a cam shaft with the cams thereon properly heated on the entrance ways at 8 whereupon the machine does all the rest and the shaft will leave the machine on the outlet ways at 9 with its cams all uniformly and properly hardened. By adjusting the hubs 22 and 28 different lengths of cam shafts may be hardened, there being required only that the air carrying boot be replaced by one of a different width whereby the same machine can be used for hardening, within limits, cam shafts of differing lengths.

Figure 8:
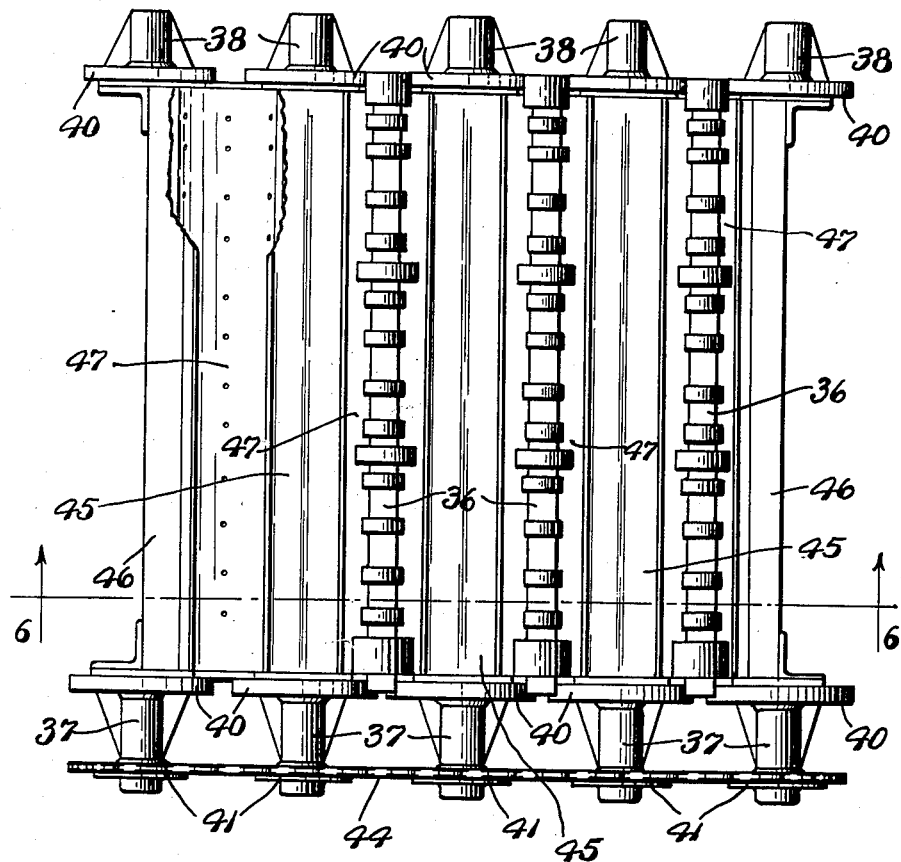
Fig. 8 is a plan view of the machine shown in Fig. 5.
Figure 7:
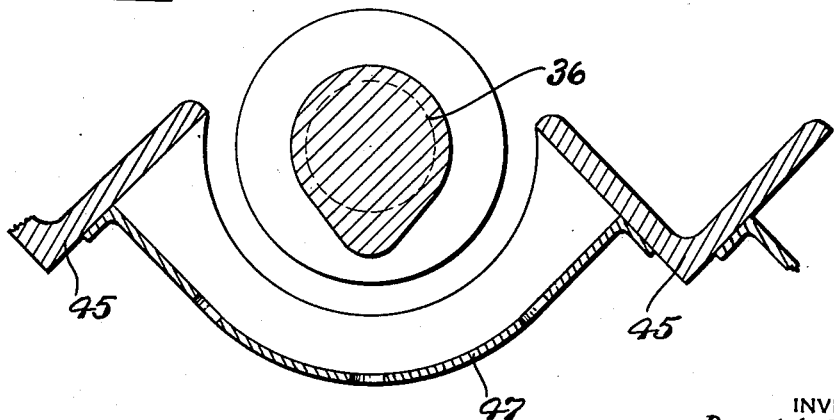
Fig. 7 is a fragmentary enlarged similar section of one of the moisture laden air directing devices over each of which a cam shaft is positioned and rotated.

In Figs. 5 to 8, inclusive, another form of machine is shown wherein the cam shafts are revolved and subjected to the projection of moisture laden air against the heated cams but the shafts do not move progressively through the machine. In the structure of the machine shown in Figs. 5 to 8, inclusive, a supporting frame 37 is used, at the upper end of which, on opposite sides thereof, journal brackets 38 are mounted in spaced apart relation and extend upwardly. The brackets each carry a shaft 39 at the inner ends of which disks 40 are secured. At one side of the machine the shafts 39 are supplied at their outer ends with sprocket wheels 41. An electric motor 42 drives a sprocket wheel 43 by means of a reduction gearing. Underneath the sprocket wheel 43 and over the sprocket wheels 41 (Fig. 5) an endless drive chain 44 is placed. The cam shafts 36 are located horizontally with their ends between adjacent disks 40 as shown in Fig. 8 whereby the cam shafts are continuously rotated.

Intermediate spaced apart bars 45 and side bars 46 (Fig. 6) of the form shown extend between the sides of the supporting frame and above the same so positioned that a cam shaft 36 when placed on adjacent disks 40 lies between the bars 45 or between a bar 45 and an outside bar 46. Curved troughs 47 of sheet metal are connected to the bars 45 and 46 so as to extend lengthwise one underneath each cam shaft placed in the machine. The troughs 47, like the top 35 of the previously described bonnet, have a large number of small openings therethrough, and serve to provide a perforated top for the air carrying bonnet of the machine shown in Figs. 5 to 8. Such bonnet has an upper section 48 rectangular in shape with a downwardly and inwardly tapered section 49 extending downwardly therefrom, into the lower end of which a vertical air carrying pipe 50 (Fig. 5) carries moisture laden air at a predetermined temperature. A blower 51 is attached to the pipe 50. Thus, the moisture laden air is forced through the openings or perforations in the troughs 47 and against the heated cams of the cam shafts 36 which are rotated above said troughs.

The alternative form of machine shown in Figs. 5 to 8, inclusive, lacks the function of progressively carrying the cam shafts through the machine and delivering them from the machine when the cooling treatment has operated for a prescribed length of time. It is necessary for the operator to place a cam shaft in place upon the rotating disks 40 and after a time remove the same. This is not required in the preferred form of structure shown in Figs. 1 to 4, inclusive. However, except for this limitation the structure of machine shown in Figs. 5 to 8, inclusive, attains all of the results of the first described machine and operates upon the same principle of operation.

The invention has proved very practical and successful in large commercial production. It is defined in the appended claims and is to be considered comprehensive of all forms of structure coming within its scope.

We claim:

1. In a machine of the class described, means for supporting and for rotating a heated cam shaft, said rotating and supporting means bearing against the cam shaft at two spaced positions, means for bodily moving the cam shaft from one position to another, and a bonnet having a perforated top positioned immediately under the path of bodily movement of the cam shaft, said bonnet being adapted to receive a cooling medium which is forced through the perforated top thereof against said cam shaft and means for forcing said cooling medium into and through the bonnet.

2. In a machine of the class described, a hollow bonnet having a top provided with a plurality of perforations therethrough, means for forcing a cooling medium into and through the the bonnet, means for bodily moving a cam shaft, the cams of which are heated, over the top of the bonnet, and means for rotating the cam shaft as it is bodily moved over the top of the bonnet, whereby said cooling medium forced into the bonnet and through the perforated top thereof is directed against the rotating heated cams of the cam shaft.

3. In a machine of the class described, a hollow bonnet having a perforated top, means for forcing a cooling medium into and through the bonnet, means for moving a plurality of heated cam shafts located in spaced relation to one another over the top of said bonnet, means for rotating the cam shafts each about its longitudinal axis simultaneously with the bodily movement thereof over the bonnet, said bonnet being adapted to have said medium forced therein and through the perforated top thereof.

4. In a machine of the class described, a hollow bonnet having a perforated top, said bonnet being adapted to have a gaseous cooling medium forced therein and through the top, means for forcing said medium into said bonnet and through its top, and means for supporting and for rotating a heated cam shaft over the top of said bonnet, and the shaft being positioned longitudinally in substantial parallelism with the length of said bonnet.

5. In a machine of the class described, a hollow bonnet having a perforated top, means for forcing a gaseous cooling medium into the bonnet and through the top, means for supporting a heated cam shaft and for moving the same bodily over the top of said bonnet from one side thereof to the other, and means for rotating the shaft as it is bodily moved, and the bonnet being adapted to have a gaseous cooling medium forced therein and through its perforated top.

6. In a machine of the class described, a horizontal shaft, means supporting the same, means for driving the shaft, disks secured one near each end of the shaft, each of said disks having a plurality of spaced apart radially extending arms between which a cam shaft may be positioned with each end of each of the cam shafts located between two adjacent arms on the disks, a sleeve mounted on the shaft lengthwise thereof between said disks, means to rotate the sleeve, a disk at each end of the sleeve, the peripheral edges of the last mentioned disks extending a short distance beyond the bottoms of the recesses between the arms on said first mentioned disks, and a bonnet located between the second disks, the upper side of which is slightly within the peripheral edges of the second disks, as and for the purposes specified.

7. A machine of the class described comprising, a supporting frame, a plurality of disks mounted at one side of the frame and above the same, the edges of adjacent disks being located closely together, means for driving all of said disks, an equal number of disks similarly mounted at the opposite side of the frame whereby an elongated cam shaft may be carried at its opposite ends by disks at the opposite sides of the frame, and a boot on said frame underneath the positions occupied by said cam shafts, said boot having a top with perforated elongated sections therein, one underneath each of the positions occupied by a cam shaft, as and for the purposes specified.

8. In a machine of the class described, means for holding, supporting and rotating a heated cam shaft in a horizontal position, the cam shaft being supported adjacent its opposite ends, and an enclosure located underneath the cam shaft having a perforated top in parallelism with and closely adjacent said heated cam shaft, said enclosure being adapted to receive a cooling medium to be forced through the perforated top against the heated cam shaft.

DONALD J. CAMPBELL.
CHARLES W. DAKE.